May 22, 1928.
C. H. WHITE
1,670,394
DISK HARROW
Original Filed July 5, 1924    3 Sheets-Sheet 2
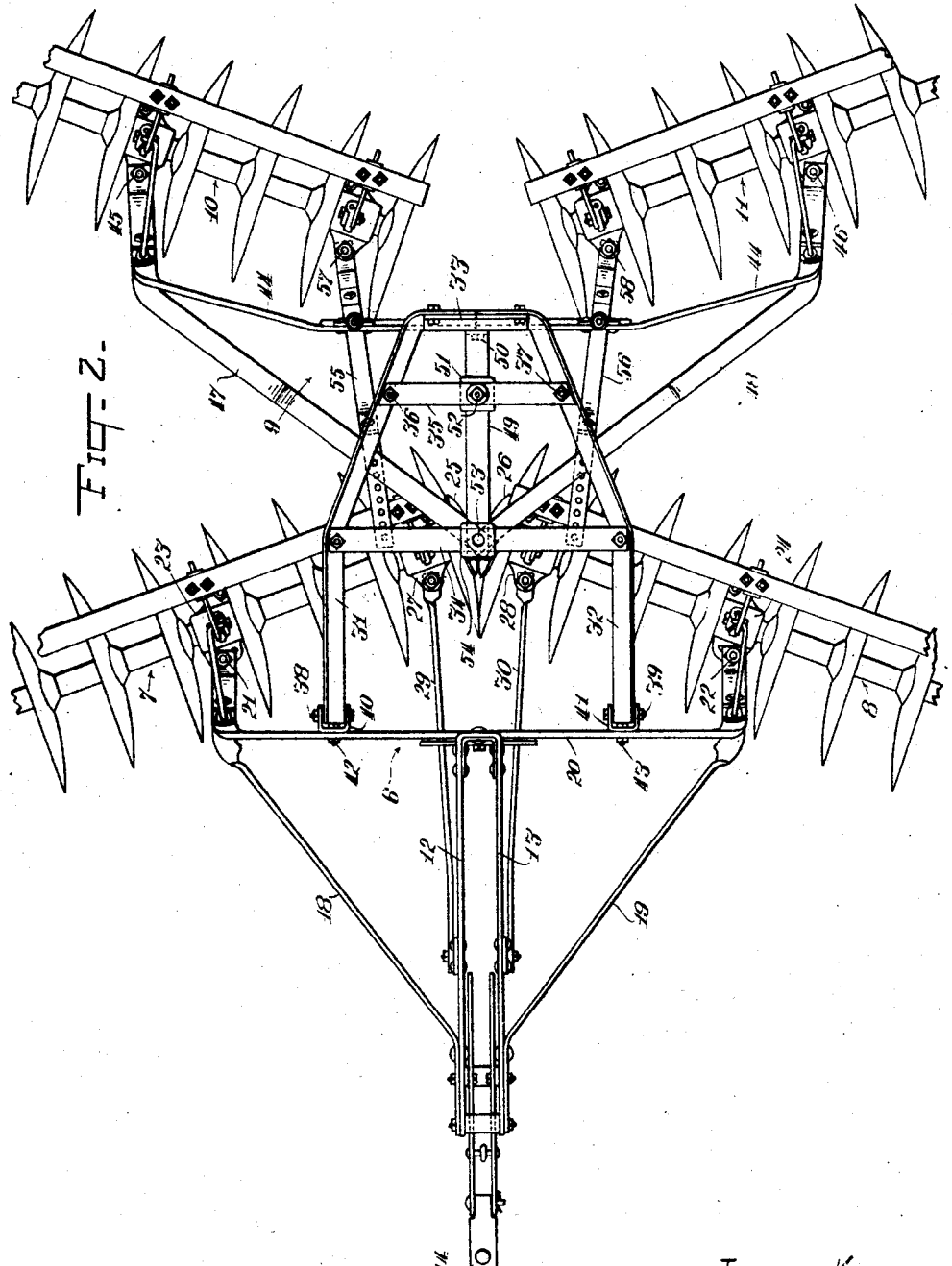

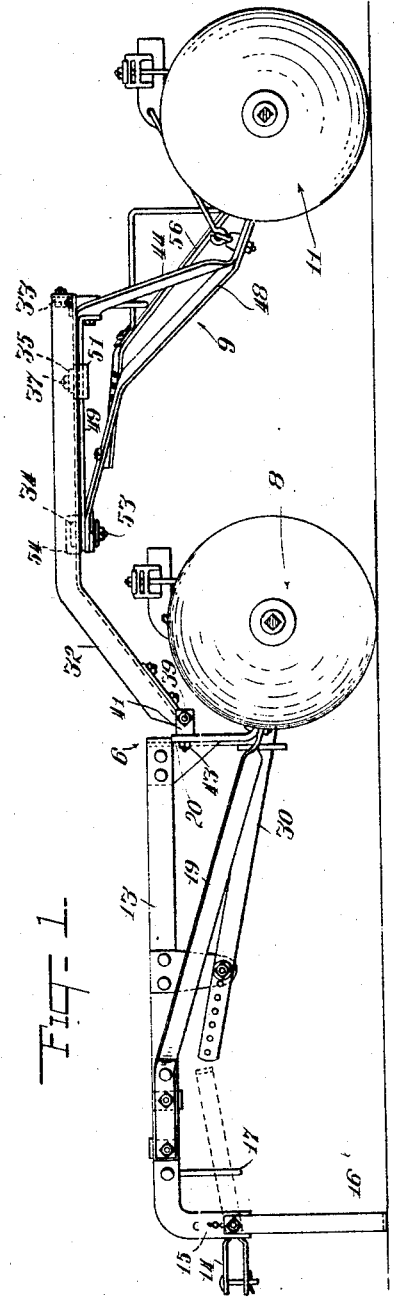

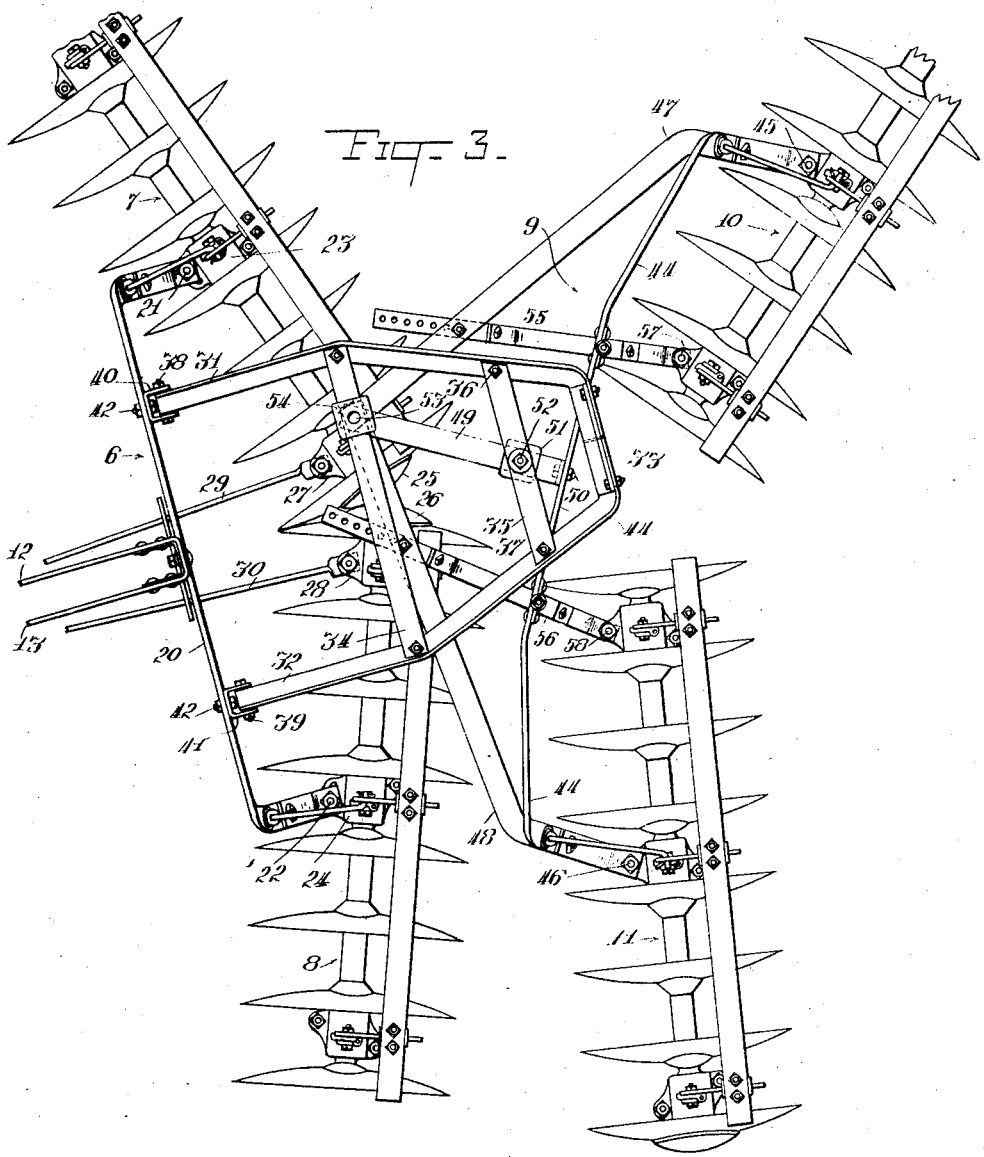

Patented May 22, 1928.

1,670,394

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

DISK HARROW.

Application filed July 5, 1924, Serial No. 724,531. Renewed October 29, 1927.

My invention relates to tandem disk harrows, or disk harrows comprising front and rear sections each composed of a pair of disk gangs so mounted that they may be turned into a position of alignment for transport purposes, which is their inoperative position, or may be turned into angular relation to each other, which is their operative position.

In harrows of the tandem type the rear section is drawn through the front section, with which the draft power, either a team or a tractor, is connected, and it has been largely the custom to connect the rear section flexibly with the front section so as to permit the front and rear units or sections to swing laterally relatively to each other for convenience in driving around trees or other obstacles, or in turning corners, as well as to permit vertical movement of either or both of the rear gangs relatively to the gangs of the front section, but a serious objection to flexibly connected tandem disk harrows as heretofore constructed is that they have not been equipped with adequate means for so controlling the position of the rear harrow section that each of the disks of the rear gangs will always work in the ridge left between the furrows turned by the pair of front disks behind which it is set, or, in other words, will not run into or across one of such furrows and thereby leave some portion of the ridge between them unturned. This relation of the disks of the rear gangs to those of the front gangs may appropriately be termed "registration," and the maintenance of registration in a disk harrow of the tandem flexibly connected type on straightaway work, and also when turns are made, so that the ridges left between the front disks will be properly cut at all times, and, in making turns, the rear gangs cannot by swinging in on the turn damage trees or strike obstacles that have been avoided by the front gangs, is a result which those skilled in the art have for many years sought to accomplish, but which prior to the invention of Frederick E. Hand, for which he has made application for Letters Patent, filed of even date herewith, has never been realized in a practical way. In the operation of flexibly connected tandem disk harrows the front section is steered, and held against any considerable oscillation about a vertical axis, by the draft power, but the rear section, being pivotally connected to the front section, in the absence of adequate controlling means is free to oscillate or swing laterally about a vertical axis independently of the front section when the disks of the opposite rear gangs encounter unequal resistance, which swinging shifts the disks from their normal registering position with relation to the disks of the front gangs. The condition of an unopposed tendency of the rear harrow section to so swing laterally, which may be termed "nervousness", is highly objectionable, as in order to properly perform their work the disks of the rear section should be held steady and maintain their registering position, and this is particularly desirable in turning, and also in side hill work, where a nervous harrow has a strong tendency to sideslip or "drift," and so get out of registration. Many constructions have heretofore been proposed to cure this nervousness and obtain stability, but while some of such attempts have been measurably successful so far as relieving nervousness on straightaway work is concerned, with the exception of said Hand invention it has been done at the expense of flexibility, and of maintaining registration on curves, or on turns to avoid obstacles.

According to said Hand invention, the objections to prior constructions are avoided and the desired results obtained by causing the draft force to operate as a positive factor in maintaining registration and overcoming nervousness by opposing oscillation or lateral swinging of the rear harrow section independently of the front section, and by directly aiding in the restoration of the rear section to its normal operative position when a straight-away course is resumed after a turning movement. My present invention has for its object to provide an improved flexible tandem disk harrow operating on this principle, but employing mechanism of a different character from the specific means shown and described in said Hand application for accomplishing the same end. This object I accomplish as illustrated in the drawings and as hereinafter described. What I regard as new is set forth in the claims.

In the accompanying drawings, in which

I have illustrated one of the various ways in which a disk harrow embodying my invention may be constructed,—

Fig. 1 is a side elevation of my improved harrow with the gangs in transport position;

Fig. 2 is a plan view of the principal parts of the harrow, some parts being broken away, and the front and rear sections being shown in their normal operative position, i. e., the position they occupy for straight-away work; and Fig. 3 is a similar view showing the position of the parts when the harrow is being turned to the left.

Referring to the drawings,—the harrow therein illustrated comprises a front or draft frame designated as a whole by the reference numeral 6, a front harrow section composed of a pair of gangs 7, 8 of any approved type, a rear frame designated as a whole by the reference numeral 9, a rear harrow section composed of a pair of gangs 10, 11, and draft connections through which the front and rear harrow sections or units are operatively connected together so that the rear unit is drawn by the front unit, and while lateral swinging of said units relatively to each other is permitted, the power of the draft is utilized as a positive factor to maintain registration and overcome nervousness as above suggested. The construction and operation of these draft connections will be fully hereinafter explained.

The front frame 6 preferably comprises two longitudinally disposed bars 12, 13 spaced apart and suitably braced together, and having at their forward ends a clevis 14 or other suitable means for connecting the harrow to a tractor, or to a team, as may be preferred. In the arrangement shown in the drawings, and particularly in Fig. 1, the forward ends of the bars 12, 13 are bent downward, as shown at 15, and the clevis 14 is secured to this downturned portion, which also has hinged to it a support 16 which may be turned down to the position shown in full lines in Fig. 1 to support the forward end of the front frame, or may be swung back to the position shown in dotted lines in said figure, when it may be held up by a hook 17. Secured to the forward portions of the bars 12, 13 are diagonal braces 18, 19, the rear ends of which are connected with a transverse frame member in the form of a beam 20, which is also secured to the rear end portions of the bars 12, 13. The end portions of the beam 20 are bent downward and backward, and are adjustably connected by vertically disposed bolts 21, 22 with bearing brackets 23, 24 carried by the gangs 7, 8 respectively. The bolts 21, 22 serve as vertical pivots about which the gangs 7, 8 respectively swing when they are adjusted to vary their angular relation to each other. At their inner ends the gangs 7, 8 are provided with the usual end thrust members in the form of convex bearing surfaces 25, 26 which bear against each other, as shown in Fig. 2, and adjacent to their inner ends said gangs are provided with brackets 27, 28 connected respectively by links 29, 30 with any suitable lever mechanism, by the operation of which the inner ends of the gangs may be moved forward or backward. These parts have not been illustrated in detail, as my invention is not concerned with the devices employed for making the usual adjustments of the gangs of each of the sections separately considered, and I wish it to be understood that the improvements that form the subject matter of this application may be applied to many of the numerous commercially known tandem disk harrows, of which that shown is one example.

Coming now to the features of construction which embody the improvements constituting the subject matter of my present application, it will be observed by reference to Figs. 1 and 2 that extending rearwardly from the transverse beam 20 is a U-shaped draft frame comprising side members 31, 32, the front ends of which are separated, while toward the rear they converge and are united by a transverse member 33, as best shown in Fig. 3. These parts are preferably made of angle iron. In the illustrated construction said side members are cross connected by a transverse draft bar 34, preferably connected with said members at the rear ends of the parallel portions thereof, and a rear cross-bar 35, the ends of which are secured to the inclined portions of the side members 31, 32 as by bolts 36, 37, as shown in Figs. 1 and 2. The cross-bar 35, as will be hereinafter explained, is located approximately midway between the transverse axes of the front and rear units or sections. By the transverse axis of a harrow section is meant a line perpendicular to the median line of such section and intersecting the longitudinal centers of the two gangs constituting such section.

The forward ends of the members 31, 32 are pivotally connected with the transverse beam 20 to swing vertically by horizontally disposed bolts 38, 39 fitted in yokes 40, 41 secured to the beam 20 by bolts 42, 43, respectively, as shown in Fig. 2. These connections are such that the draft frame comprising the members 31, 32 and their associated parts above described, may swing vertically and also to a slight extent about a longitudinal axis, so that either of the rear gangs may rise or fall to some extent independently of the other, or they may move vertically in unison, so that said gangs may accommodate themselves to any inequalities in the ground. As shown in the drawings, said draft frame is symmetrically mounted with reference to the beam 20, that is to say, the members 31, 32 lie at opposite sides of the median line of the front harrow unit, or of the harrow as a whole when the front and rear sections are in their normal position for straight-away work, and are equally distant therefrom. From the foregoing description it will be seen that said draft frame forms a part of the front unit and swings laterally therewith when said unit is turned in either direction from a straight-away position.

The frame of the rear harrow section comprises a transverse beam 44, which is similar to the beam 20 and is similarly connected to the rear gangs by vertical pivots 45, 46 about which the gangs 10, 11 swing when they are adjusted to change their angular relation to each other. In other respects also the connection of the rear gangs with the beam 44 is standard construction, and therefore need not be described. Extending forward from the end portions of the beam 44 are forwardly converging bars or braces 47, 48 that meet in an apex lying in the median line of the rear harrow section or unit, and in the median line of the harrow as a whole when it is in its normal position. Also lying in the median line of the rear harrow section, and constituting a part of the frame of said section, is a member 49 in the form of a rigid bar, the rear end of which is fixedly connected to the central portion of the beam 44 by a bolt 50, best shown in Fig. 3, and its forward end extends to the apex of the braces 47, 48 and is rigidly connected thereto. When the harrow is in its normal position, therefore, the member 49 stands at right angles to the center of the cross-bar 35, as shown in Fig. 2, and is preferably in a plane below and adjacent to said cross-bar, as shown in Fig. 1. The member 49 is arranged to slide longitudinally of itself in guideways provided in a fulcrum block 51 that is pivotally connected with the center of the cross-bar 35 by a vertical bolt 52, so that said block may rock in a horizontal plane about the pivot 52 to accommodate itself to changes in the angular relation of the front and rear harrow units to each other, as illustrated in Fig. 3. The bolt 52 is located in the median line of the harrow at a point that is approximately midway between the transverse axes of the harrow units, and the block 51 serves as a pivotal connection between the front and rear units and as a fulcrum for the member 49.

The joined front ends of the braces 47, 48 and member 49 are pivotally connected by a vertical pivot 53 to a slide block 54 mounted to slide transversely of the U-shaped draft frame on the bar 34, as will be manifest from a comparison of Figs. 2 and 3. When the harrow units are in their normal position it will be apparent that the member 49 lies in the median line of the harrow, and consequently the slide block 54 also is then in said line so that the draft force is applied centrally to the rear unit through the transverse bar 34 and said slide block. When, however, said units are angled relatively to each other they swing about the pivot 52 as a center, and consequently the slide block 54 is moved transversely along the draft bar 34 in one direction or the other from its central position, depending on the direction in which the harrow units are turned. For example, in the arrangement illustrated in Fig. 3, the front harrow unit is being turned to the left, and therefore the rear unit relatively swings to the right, moving the slide block 54 along the draft bar 34 also to the right, so that the point of application of the draft to the rear unit is shifted from the center line inversely, or in a direction opposite that in which the turn is being made. By connecting the units together so that they turn relatively to each other about a center substantially midway between their transverse axes, when the units are angled relatively to each other their transverse axes projected converge and intersect at a point which is the center of a circle the radius of which may be measured from such center to the center of the median line of either harrow unit. It follows that the disks of corresponding front and rear gangs follow the same arc in making a turn, or substantially so, so that registration is maintained. The position of the pivot 52 has been described as being approximately midway between the transverse axes of the front and rear units, because it is not always exactly equidistant from both said transverse axes. In the construction illustrated it is at a fixed distance from the transverse axis of the front harrow unit, but it will be noted that when the units are angled relatively to each other the member 49 moves longitudinally or fore and aft through the fulcrum block 51, thereby moving the transverse axis of the rear unit to a slight extent toward or from said pivot, or, in other words, moving the transverse axes of the two units relatively toward or from each other. The arrangement is such that when the units are turned in either direction away from their straight-away position, the relative forward movement of the slide block 54 moves the member 49 relatively forward through the fulcrum block 51, bringing the centers of the transverse axes of the units closer together, and, conversely, when the harrow is straightened again their transverse axes move farther apart. This relative movement of the units toward or from each other is not sufficient to interfere with substantial registration of the disks of the front and rear gangs, but to minimize its effect so far as registration is concerned, in practice the pivot 52 is located somewhat nearer the transverse axis of the front unit so that in making an ordinary turn the relative approach of the transverse axis of the rear unit toward that of the front unit will substantially neutralize the off center position of said pivot. In making a very sharp turn the center of the transverse axis of the rear unit may move slightly closer to the pivot 52 than that of the front unit, but in practice these variations from mathematical exactness are not important.

As has been explained, the draft is applied to the rear harrow section through the slide block 54, and therefore its point of application to the rear unit is shifted inversely laterally relatively to the fulcrum block 51 when the harrow units are angled relatively to each other, and this lateral shifting of the point of application of the draft occurs even when the deviation of the harrow units from their normal position is only slight. Also, as any angling movement away from their normal position moves the rear harrow unit relatively toward the front unit, the rear unit cooperates with the draft to restore the harrow sections to their normal position whenever there is any deviation from such position, since such relative forward movement of the rear section requires the expenditure of draft force, owing to the ground resistance of the rear gangs, which gives them a tendency to lag and therefore to move the member 49 back into the median line of the harrow.

From the foregoing description it will be seen that the force of the draft tends to hold the front and rear units in their normal or straight-away position and to resist angling thereof, so that my improved harrow is not nervous, and does not side slip or drift on side hill work; moreover, when the units are angled, as in rounding a curve, the point of application of the draft is shifted toward the outside of the curve, where it is more effective for restoring the units to their normal position. At the same time the draft connections are such that the disks of corresponding front and rear gangs are held in registering position both in straight-away work and in turning movements. The provision of means by which these results may be accomplished is not claimed generically herein as of my invention, but I believe myself to be the first to couple together the front and rear units of a tandem disk harrow by means of draft devices comprising a member rigidly connected with one of such units and fulcrumed on the other unit to swing laterally, together with a draft connection between said units shiftable laterally relatively to such fulcrum by lateral swinging of said member about its fulcrum due to the angling of the units relatively to each other, and particularly the arrangement of the parts so that the draft connection is shifted inversely. While I prefer to embody my invention in the manner illustrated and described, my invention is not restricted to such combination and arrangement of parts, as various modifications thereof may be made within the scope of the claims appended hereto.

In the drawings I have shown the gangs of the rear unit as being angularly adjustable relatively to each other, their angular position being controlled by links 55, 56 pivotally connected at their rear ends by bolts 57, 58 with the inner end portions of the gangs 10, 11, respectively, and arranged to be adjustably connected at different points with the bars 47, 48. This, however, is only one of several ways in which the angular position of said gangs may be controlled, as is well understood by those familiar with the art.

What I claim as my invention and desire to secure by Letters Patent, is—

1. In a tandem disk harrow, the combination of front and rear disk-carrying units, and draft devices coupling said units together to swing laterally relatively to each other comprising a member rigidly connected with one of said units and fulcrumed on the other unit to swing laterally, and a draft connection between said units shiftable laterally by lateral swinging of said member about its fulcrum due to the angling of said units relatively to each other.

2. In a tandem disk harrow, the combination of front and rear disk-carrying units, and draft devices coupling said units together to swing laterally relatively to each other comprising a member rigidly connected with one of said units and fulcrumed on the other unit to swing laterally, and a draft connection between said units shiftable inversely laterally by lateral swinging of said member about its fulcrum due to the angling of said units relatively to each other.

3. In a tandem disk harrow, the combination of front and rear disk-carrying units, and draft devices coupling said units together to swing laterally relatively to each other comprising a member rigidly connected with one of said units and fulcrumed on the other unit to swing laterally, and a draft connection between said units shiftable inversely laterally relatively to such fulcrum by lateral swinging of said member about its fulcrum due to the angling of said units relatively to each other.

4. In a tandem disk harrow, the combination of front and rear disk-carrying units, and draft devices coupling said units together to swing laterally relatively to each other comprising a member rigidly connected with one of said units and fulcrumed on the other unit to swing laterally, said member having also a draft connection with the latter unit shiftable laterally relatively thereto by lateral swinging of said member about its fulcrum due to the angling of said units relatively to each other.

5. In a tandem disk harrow, the combination of front and rear disk-carrying units, and draft devices coupling said units together to swing laterally relatively to each other comprising a member rigidly connected with one of said units and fulcrumed on the other unit to swing laterally, said member having also a draft connection with the latter unit shiftable inversely laterally relatively thereto by lateral swinging of said member about its fulcrum due to the angling of said units relatively to each other.

6. In a tandem disk harrow, the combination of front and rear disk-carrying units, and draft devices coupling said units together to swing laterally relatively to each other comprising a member rigidly connected with one of said units and fulcrumed on the other unit at a point approximately midway between the transverse axes of said units to swing laterally, and a draft connection between said units shiftable inversely laterally relatively to such fulcrum by lateral swinging of said member about its fulcrum due to the angling of said units relatively to each other.

7. In a tandem disk harrow, the combination of front and rear disk-carrying units, and means coupling said units together to swing laterally relatively to each other comprising a member rigidly connected with one of said units and fulcrumed intermediately on the other unit to swing laterally, and draft means connected with said member and shiftable inversely laterally away from the median line of the harrow by the turning of said units away from their normal position.

8. In a tandem disk harrow, the combination of front and rear disk-carrying units, means coupling said units together to swing laterally relatively to each other comprising a member rigidly connected with one of said units and lying in the median line thereof, said member being fulcrumed on the other unit at a point approximately midway between the transverse axes of said units, and a draft connection between said member and such other unit shiftable laterally by the angling of said units relatively to each other.

9. In a tandem disk harrow, the combination of front and rear disk-carrying units, means coupling said units together to swing laterally relatively to each other comprising a member rigidly connected with one of said units and lying in the median line thereof, means fulcruming said member on the other unit and arranged to permit longitudinal movement of said member, and a draft connection between the front and rear units shiftable laterally by the angling thereof relatively to each other.

10. In a tandem disk harrow, the combination of front and rear disk-carrying units, means coupling said units together to swing laterally relatively to each other comprising a member rigidly connected with one of said units and lying in the median line thereof, means fulcruming said member on the other unit and arranged to permit longitudinal movement of said member, and a draft connection between said front unit and said member shiftable laterally by the angling of said units relatively to each other.

11. In a tandem disk harrow, the combination of front and rear disk-carrying units, means coupling said units together to swing laterally relatively to each other comprising a member rigidly connected with the rear unit and lying in the median line thereof, said member being fulcrumed on the front unit approximately midway between the transverse axes of said units, a transversely disposed draft member on said front unit, and means connecting said draft member with the rear unit at a point forward of said fulcrum and shiftable laterally relatively to the median line of the harrow by the angling of the harrow units.

12. In a tandem disk harrow, the combination of front and rear disk-carrying units, means coupling said units together to swing laterally relatively to each other comprising a member rigidly connected with one of said units and lying in the median line thereof, means fulcruming said member on the other unit approximately midway between the transverse axes of said units and arranged to permit longitudinal movement of said member, and a draft connection between said front unit and said member shiftable laterally by the angling of said units relatively to each other.

13. In a tandem disk harrow, the combination of front and rear disk-carrying units, means coupling said units together to swing laterally relatively to each other comprising a member rigidly connected with one of said units and lying in the median line thereof, means fulcruming said member on the other unit approximately midway between the transverse axes of said units and arranged to permit longitudinal movement of said member, a transversely disposed draft member on said front unit, and means connecting said draft member with the rear unit and shiftable laterally relatively to the median line of the harrow by the angling of the harrow units.

14. In a tandem disk harrow, the combination of front and rear disk-carrying units, means coupling said units together to swing laterally relatively to each other comprising a member rigidly connected with the rear unit and lying in the median line thereof, said member being fulcrumed on the front unit approximately midway between the transverse axes of said units, a transversely disposed draft bar carried by the front unit, and a draft block movable on said draft bar and pivotally connected with said member at a point forward of the fulcrum thereof.

15. In a tandem disk harrow, the combination of front and rear disk-carrying units, means coupling said units together to swing laterally relatively to each other, a member rigidly connected with the rear unit and lying in the median line thereof, a fulcrum block pivotally and slidably connecting said member with said front unit at a point approximately midway between the transverse axes of said units, a transversely disposed draft bar carried by the front unit, and a draft block movable on said draft bar and pivotally connected with said member at a point forward of the fulcrum thereof.

CHARLES H. WHITE.